(No Model.) 8 Sheets—Sheet 1.

G. W. MILTIMORE.
MACHINE FOR DRESSING AND HARDENING CAR WHEELS AND OTHER BODIES.

No. 347,949. Patented Aug. 24, 1886.

Attest:
Geo. H. Botts.
J. A. Hoovey.

Inventor:
George W. Miltimore
by Munson & Philipp
his Attys

(No Model.)

G. W. MILTIMORE.
MACHINE FOR DRESSING AND HARDENING CAR WHEELS AND OTHER BODIES.

No. 347,949. Patented Aug. 24, 1886.

(No Model.)  8 Sheets—Sheet 8.

G. W. MILTIMORE.
MACHINE FOR DRESSING AND HARDENING CAR WHEELS AND OTHER BODIES.

No. 347,949. Patented Aug. 24, 1886.

Attest:
Geo. H. Botts.
J. A. Hoovy.

Inventor:
George W. Miltimore
by Munson & Philipp
his Attys.

UNITED STATES PATENT OFFICE.

GEORGE W. MILTIMORE, OF ARLINGTON, VT., ASSIGNOR TO THE UNITED STATES CAR WHEEL DRESSING COMPANY, OF CHICAGO, ILL.

MACHINE FOR DRESSING AND HARDENING CAR-WHEELS AND OTHER BODIES.

SPECIFICATION forming part of Letters Patent No. 347,949, dated August 24, 1886.

Application filed March 11, 1886. Serial No. 194,812. (No model.)

*To all whom it may concern:*

Be it known that I, GEORGE W. MILTIMORE, a citizen of the United States, residing at Arlington, county of Bennington, and State of Vermont, have invented certain new and useful Improvements in Machines for Dressing and Hardening Car-Wheels and other Bodies, fully described and represented in the following specification and the accompanying drawings, forming a part of the same.

In an application for Letters Patent filed by me on February 19, 1886, Serial No. 192,490, I have described and illustrated a method of dressing, or dressing and hardening, the surfaces of metal bodies, which consists in passing the surface to be dressed, or dressed and hardened, in close proximity to the edge or periphery of a rapidly-revolving smooth metal disk or wheel. By this means the orignal surface can be burned and melted away to any desired depth, leaving a new surface which is perfectly smooth and even and of high finish, and, under certain conditions, also of great hardness. This method, while applicable to the dressing, or dressing and hardening, of many classes of metal bodies, can be applied with especial advantage to the dressing or turning of car-wheels and other bodies which are made of chilled iron or highly-hardened steel, and which cannot be successfully acted upon by a cutting-tool, and also to the dressing and hardening of the surfaces of car-wheels and other bodies which are made of low-carbon steel, which cannot be hardened by any of the common processes.

The present invention relates to a mechanism which is designed for use in dressing or turning car-wheels and other cylindrical bodies, according to the method described in my said former application.

As a full understanding of the invention can be best imparted by a detailed description of the mechanism embodying the same, all further preliminary description will be omitted and a full description given, reference being had to the accompanying drawings, in which—

Figures 9, 10, 11:
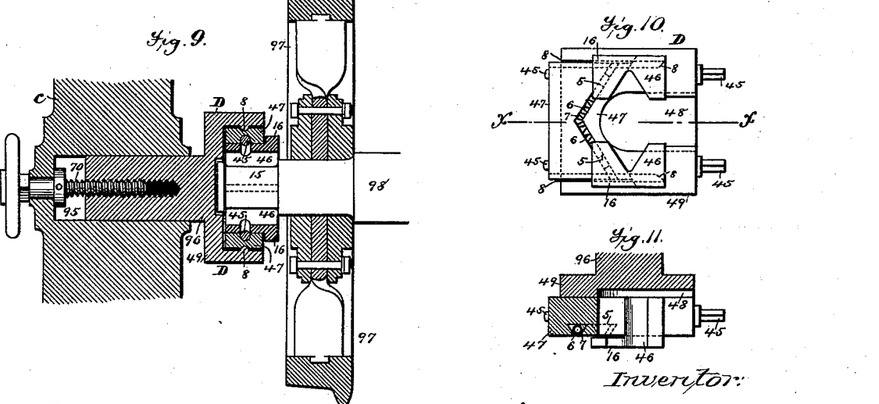
Fig. 9 is an enlarged section taken on the line $y\ y$ of Fig. 1.
Fig. 10 is an inside view of one of the chucks or bearings which support the axle upon which the wheels are fixed.
Fig. 11 is a horizontal section of the chuck, taken upon the line $x\ x$ of Fig. 10.
Figure 12:
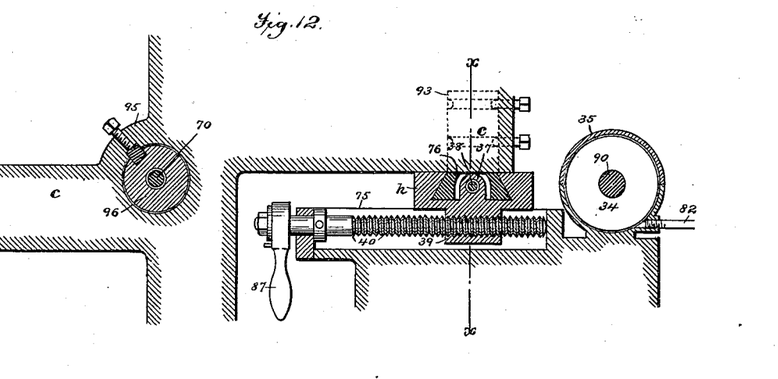
Fig. 12 is an enlarged section taken upon the line $z\ z$ of Fig. 1.

Referring to said figures, it is to be understood that A is a base of suitable size and weight to properly support the various parts of the machine. This base is provided at its ends with upright portions B, which are provided at one side of the machine with bearings 77, in which is mounted a shaft, 90, which is provided with two smooth steel disks or wheels, 99. The disks or wheels 99 are made of a fine quality of steel, so as to possess great strength and be capable of being revolved at a very great speed without danger of breaking by reason of their centrifugal force, and are so shaped, as shown, that their edges or peripheries form the counterparts of the treads and flanges of a pair of car-wheels. The shaft 90 is provided just outside the disks 99 with small pulleys or enlargements 91, around which pass belts for transmitting motion to the shaft from any suitable source of power. In order that the disks 99 may be driven at a sufficiently high speed, it is desirable that the shaft 90 and pulleys 91 should be of a comparatively small size, and consequently, to prevent the shaft from springing, there are provided two upright portions, $a$, which rise from the base A and afford bearings 78 for the shaft between the disks, thus preventing the shaft from springing and causing the disks to wabble. The upright portions B also support a movable frame-work or carriage, C, composed of end pieces, $c$, which rest upon flat bearings 88 89, formed on the portions B, and are rigidly connected to each other by tie-beams $b\ d$. The end pieces, $c$, of the frame C are provided with bearings 95, into which fit spindles 96, (see Figs. 9 and 12,) which project inward through the frame-pieces, and are provided at their inner ends with chucks D, which are adapted to receive and support the ends 15 of the axle 98 of a pair of car-wheels, 97. The spindles 96 are splined to the bearings 95, (see Fig. 12,) so as to be prevented from turning therein, and are provided with adjusting-screws 70, by which the chucks can be adjusted to and from each other, so as to receive the ends of axles which vary somewhat in length.

The chucks D consist of metal blocks 49, which are provided upon their inner faces with horizontal recesses 48, which are of proper form at one end (see Figs. 6, 10, and 11) to receive the ends 15 of the axle 98, and at the other end to receive sliding jaws 47, (see Figs. 2, 5, 10, 11,) which are held and guided in the recesses by ribs 8, which enter grooves in the upper and lower sides of the jaws. The jaws 47 are forked at their inner ends, as shown, so as to partially embrace the ends 15 of the axle, and are provided upon their outer faces with oblique converging dovetailed grooves 6, into which fit correspondingly-shaped ribs 5, formed on overlapping projections 16, extending from a pair of jaws, 46, which lie in the recesses 48, and are arranged to move toward each other along the inclined forks of the jaws 47. The jaws 46 are so formed, as will be observed, that as they approach each other they act to partially embrace the ends 15 of the axle on the sides opposite to the jaws 47. The blocks 49 are provided with screw-rods 45, which pass through openings in the jaws 46 and enter the jaws 47. The operation of these chucks is as follows: The ends 15 of the axle 98 having been entered into the recesses 48, the screw-rods 45 will be operated so as to draw the jaws 47 inward and cause their forked ends to partially embrace one side of the ends 15 of the axle. As this is done the jaws 46 will be forced toward each other along the inclines of the forks of the jaws 47, so as to partially embrace the ends 15 of the axle on the opposite side, and thus the jaws 47 46 will together grasp and center and hold the ends of the axle firmly in the chucks, so as to prevent it from being moved in any direction. They will not, however, grasp it so firmly as to prevent it and the wheels 97 from being revolved freely, so as to bring all portions of the circumference of the wheels into position to be acted on by the disks 99. The recesses 6 are provided with springs 7, which act upon the ribs 5 of the jaws 46, so as to move the jaws from each other when the rods 45 are operated in the reverse direction, and thus allow the ends of the axle to be readily removed from the chucks.

The proper rotation of the wheels 97 and axle 98 is effected as follows: The shaft 90 is provided with a small pulley, 60, which is connected by a belt, 61, with a pulley, 62, upon a small shaft, 63, which is supported in bearings in the ends of cross-pieces 92, secured to one of the tie-beams $b$ of the frame C. The shaft 63 is also provided with a number of pulleys, 59, of varying sizes, one of which is connected (it may be any one of the number, depending upon the speed at which it is desired that the wheels 97 should be revolved) by a belt, 24, with the corresponding one of a series of different-sized plulleys, 58, upon a shaft, 64, which is mounted in the opposite ends of the cross-pieces 92. The shaft 64 is also provided with two pulleys, 57, which are connected by belts 56 with pulleys 55 upon the ends of a pair of shafts, 65, which turn in sleeves 66, and are provided at their ends with worms 54, which engage with worm-wheels 53 upon short shafts 67, which are also provided with friction-wheels 52, which bear upon the treads of the car-wheels 97. The shafts 67 are supported in the ends of arms 68, which extend from a rock-shaft, 69, which in turn is supported in bearings on the tie-beam $d$. The sleeves 66, through which the shafts 65 pass, are supported at their outer ends by bearings 51, which surround the shafts 67, and at their inner ends by rods 71, extending from the tie-beam $d$. The arms 68 are rocked, so as to hold the wheels 52 in constant engagement with the treads of the car-wheels 97, by means of springs 72, which are interposed between ears 50, projecting from the arms 68, and a plate, 73, which is provided with an adjusting-screw, 74, by which it can be raised and lowered to vary the tension of the springs and cause them to hold the wheels 52 against the car-wheels with any desired amount of pressure. The tie-beam $b$ above the wheels 97 is provided with a number of pivoted dogs or stops, 25, which rest upon one or both of the wheels in such position, as shown, as to prevent the wheels from being turned except in the proper direction.

The movable frame or carriage C, which supports the wheels 97 and the apparatus for revolving them to present all portions of their treads and flanges to the disks 99, is provided with means by which it can be adjusted to and from the disks 99, so that the wheels 97 may be moved up to the disks as the dressing progresses, and also with means by which it can be adjusted longitudinally, so that after the wheels 97 and axle 98 have been suspended in the chucks D the whole can be adjusted so as to bring the wheels exactly opposite the disks. For this purpose the bearings 88 are provided with movable blocks $h$, which are interposed between the bearings and the pieces $c$, and are provided upon their under sides with dovetailed grooves, which receive correspondingly-shaped ribs 75, formed on the tops of the bearings, and upon their upper sides with similar grooves arranged at right angles to those upon their under sides, which receive correspondingly-shaped ribs 76, secured to studs 93, which enter the pieces $c$.

The adjustment of the frame C to and from the disks 99 is effected by means of screw-rods 40, (see Figs. 12 and 13,) which are held in the ribs 75 and work in nuts 39, formed on the under sides of the blocks $h$. The adjustment of the frame C longitudinally is effected by means of screw-rods 38, which are held in the ribs 76 and work in nuts 37, formed on the upper sides of the blocks $h$. The ends of the rods 38 40 are formed to receive a ratchet or other suitable form of wrench, as 87, by which the rods can be conveniently operated.

Figures 13, 14:
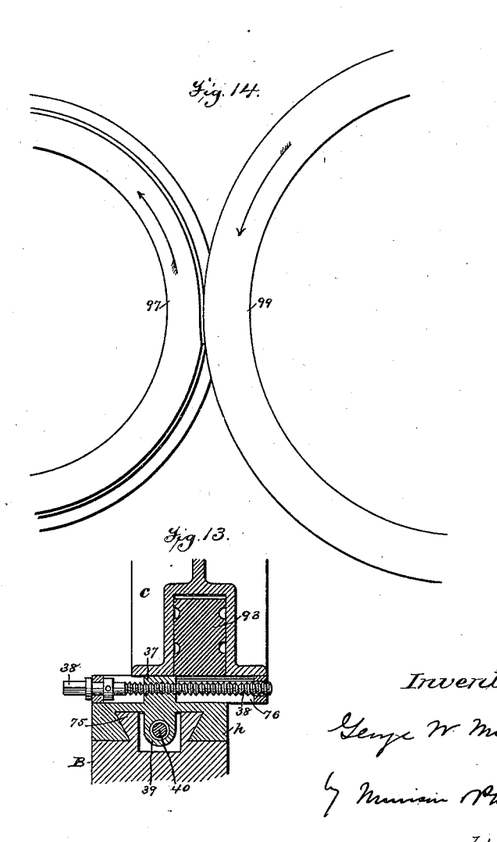
Fig. 13 is a section taken on the line $x\ x$ of Figs. 3 and 12.
Fig. 14 is a partial side elevation of one of the wheels and disks, illustrating the dressing operation.

The operation of the mechanism thus organized is as follows: The axle 98, carrying the wheels 97, having had its ends centered and secured in the chucks D, the frame C will, if necessary, be adjusted longitudinally by the screw-rods 38 until the wheels 97 are in exactly the proper position opposite the disks 99. The screw-rod 74 will also be operated, if necessary, so as to cause the friction-wheels 52 to bear against the treads of the wheels 97 with considerable pressure. The shaft 90, carrying the disks 99, will then be set in motion in the direction indicated by the arrow, thereby, through the belt 61 and other connections described, setting in motion the friction-wheels 52 and causing the wheels 97 to be revolved slowly in the same direction, as also indicated by the arrow. As soon as the disks 99 have attained a sufficient speed—say from two thousand five hundred to three thousand revolutions per minute, assuming the disks to be from thirty-five to forty-two inches in diameter—the screw-rods 40 will be operated so as to move the frame C toward the disks until the treads and flanges of the wheels are brought into contact with or into exceedingly close proximity to the peripheries of the disks. As soon as this takes place that portion of the surface of each wheel which is in contact with or in closest proximity to its disk will be burned or melted away, as indicated in Fig. 14, and as the wheels are slowly revolved by the friction-wheels 52, so as to successively present all parts of their peripheries to the disks, the entire surface of the tread and flange of each wheel will be burned and melted away to a uniform depth, thus removing the old and uneven surface and producing a new surface, which is perfectly smooth and uniform and of high finish. This will be accomplished, no matter how hard or how soft the metal of which the wheels are composed, or whether it is of iron or steel, without any perceptible wear upon the disks, and without imparting any objectionable amount of heat to the disks, and also without heating the wheels to any considerable extent, except at the immediate point which is being acted upon. By continuing the operation and properly operating the screw-rods 40, so as to move the wheels up to the disks as the dressing progresses, the wheels may be dressed down to any desired extent for the purpose of removing irregularities or of reducing them to the proper diameter. The end frames, B, will preferably be provided with graduated scales, as $g$, (see Fig. 3,) which will serve as guides to the operator in adjusting the frame C, and enable him to keep both ends of the frame in the same position with relation to the disks, so that the two wheels will be dressed exactly alike.

Figure 1:
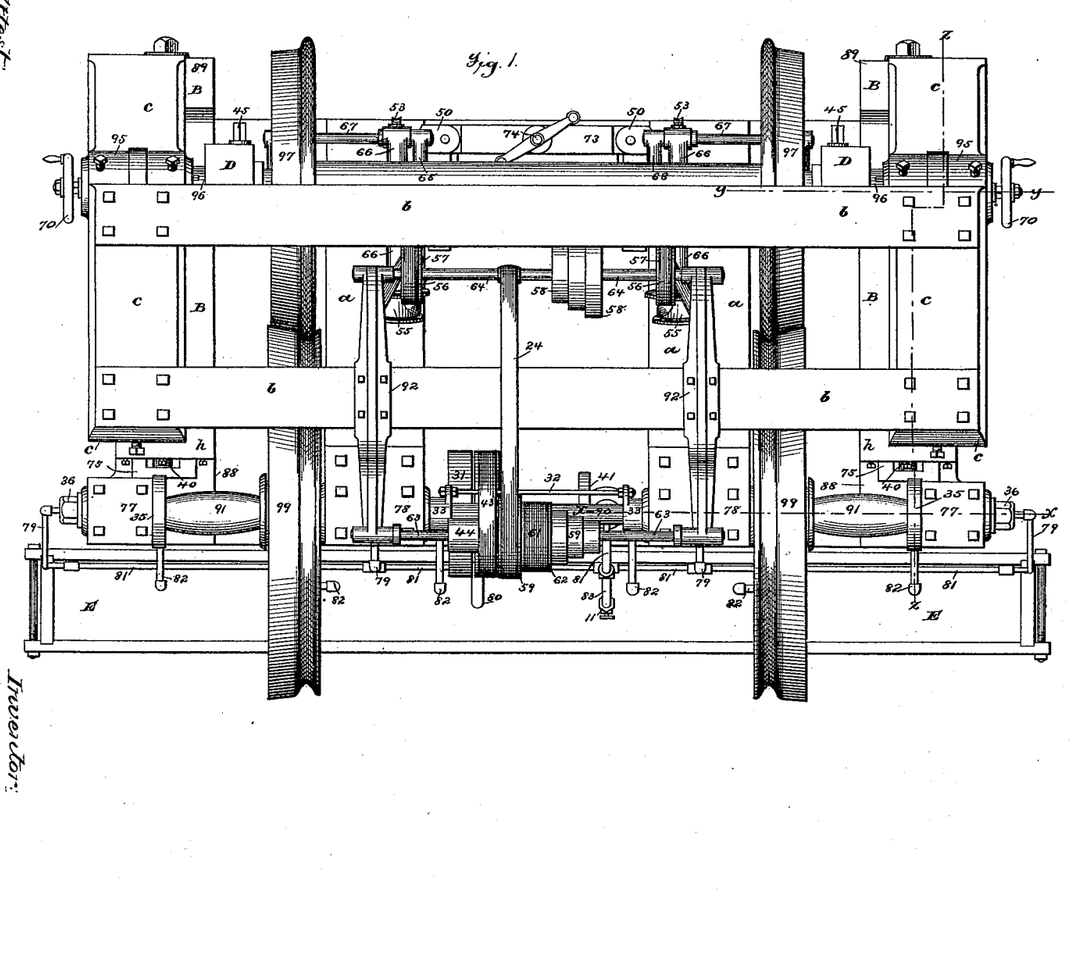
Figure 1 is a plan view of a mechanism for dressing the treads and flanges of car-wheels.
Figure 2:
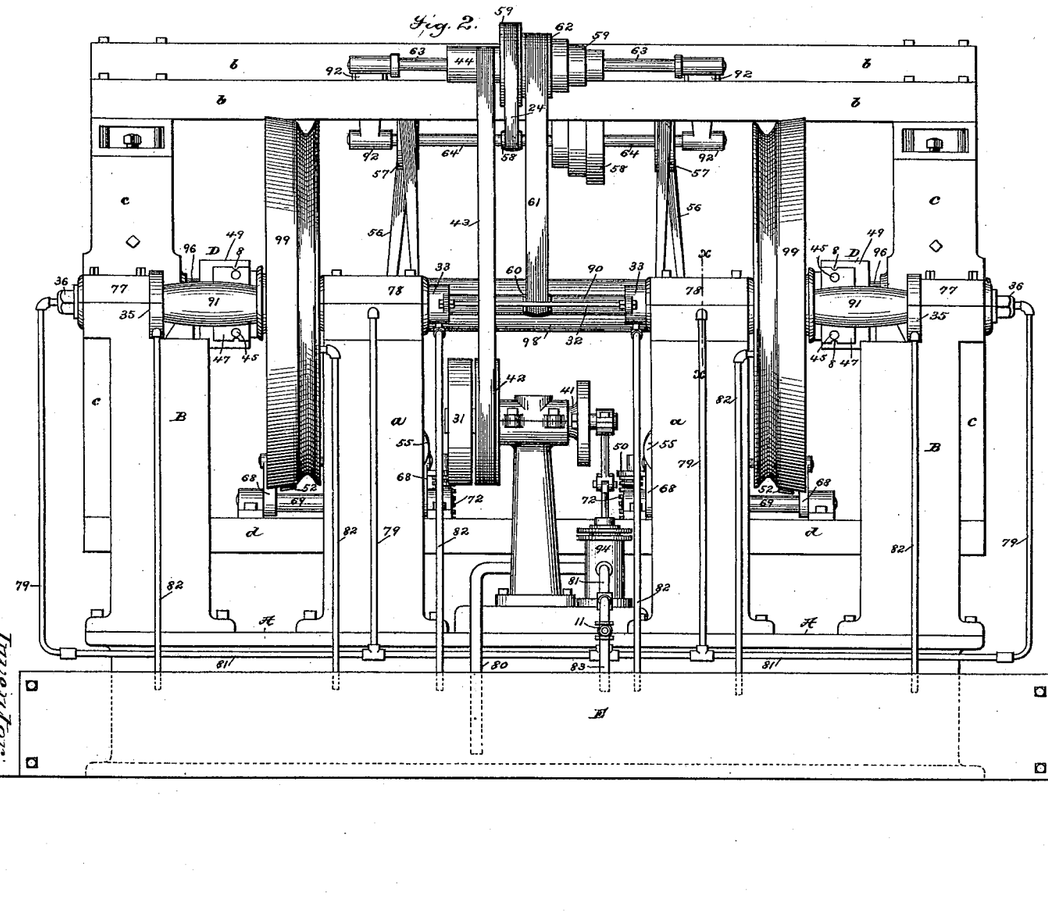
Fig. 2 is a side elevation of the same.
Figure 3:
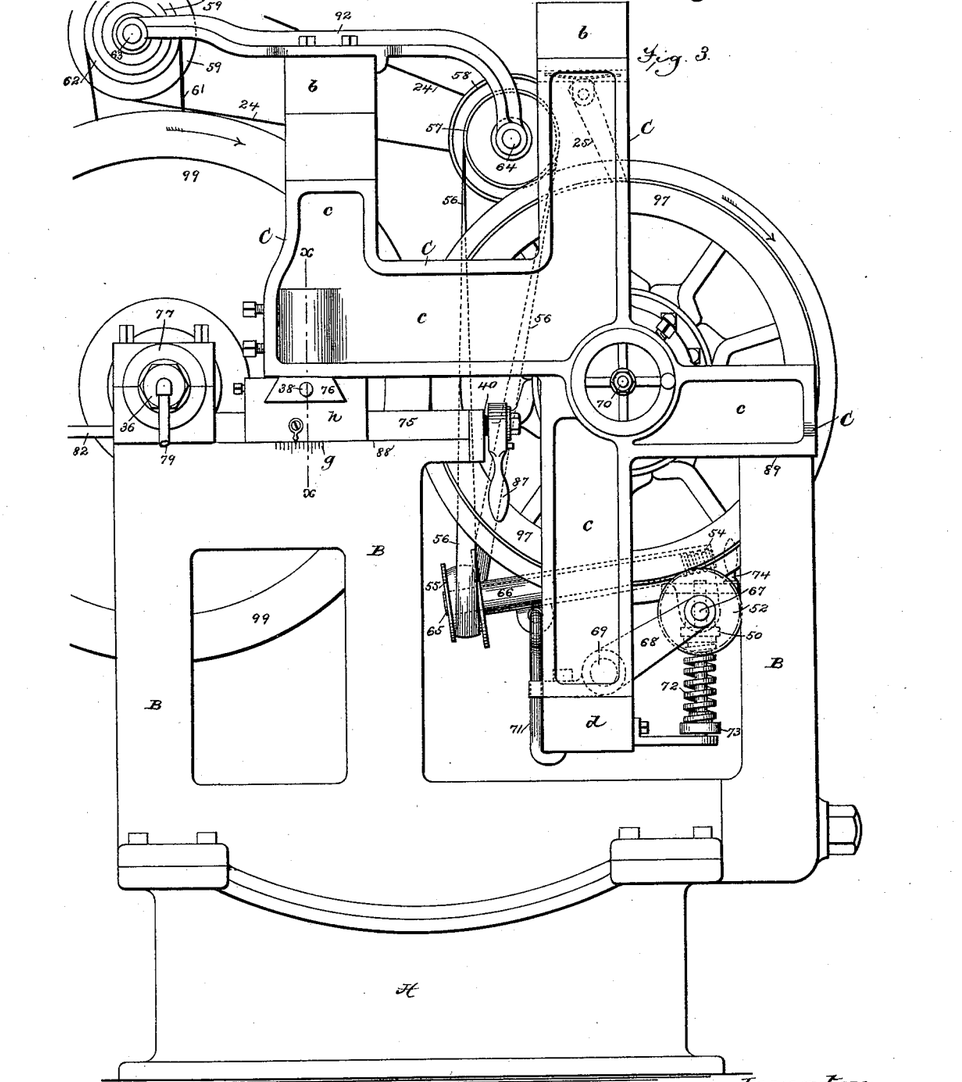
Fig. 3 is an end elevation of the same upon an enlarged scale, looking from the right of Figs. 1 and 2.
Figure 4:
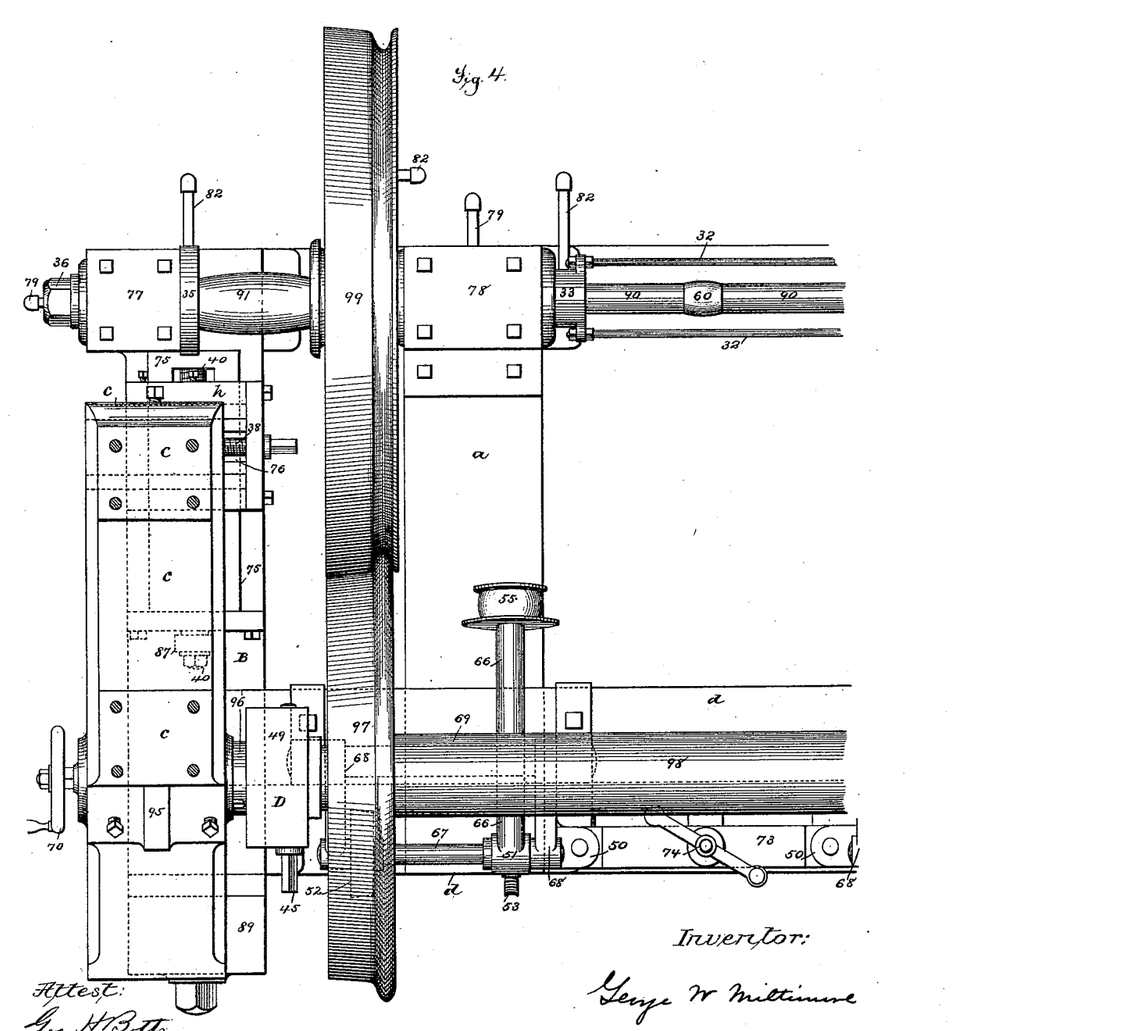
Fig. 4 is a partial plan view of the machine upon a like scale, certain of the upper parts being removed.
Figure 5:
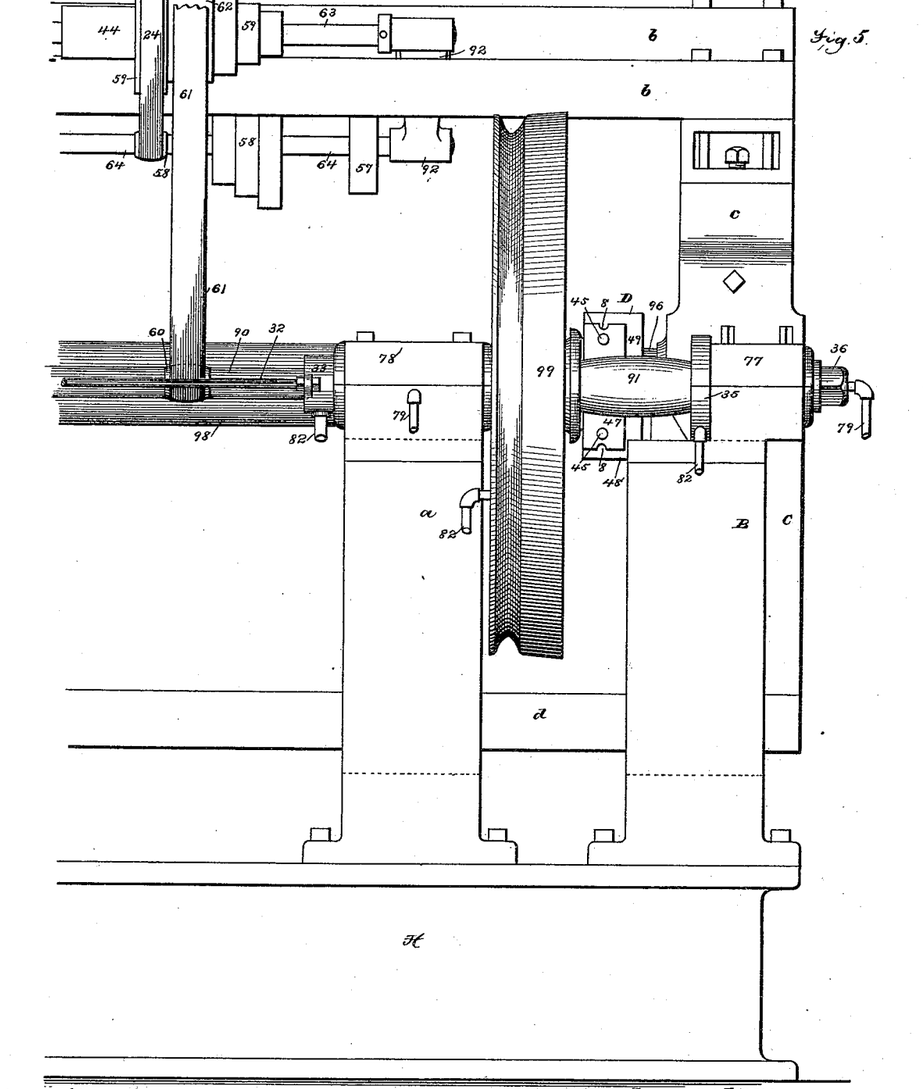
Fig. 5 is a partial side elevation of the machine upon a like scale.
Figure 6:
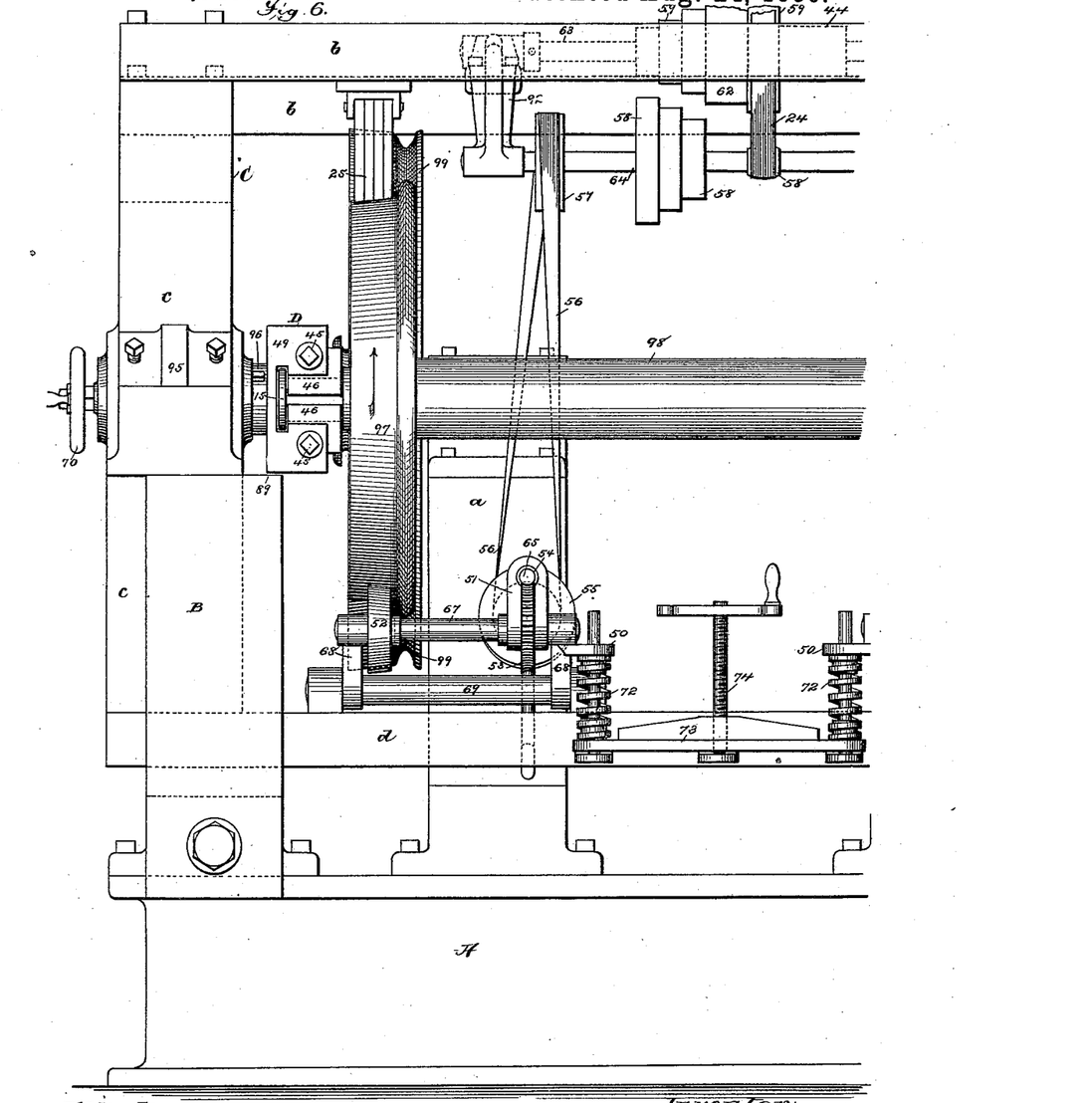
Fig. 6 is a similar view looking from the opposite side of the machine.
Figures 7, 8:
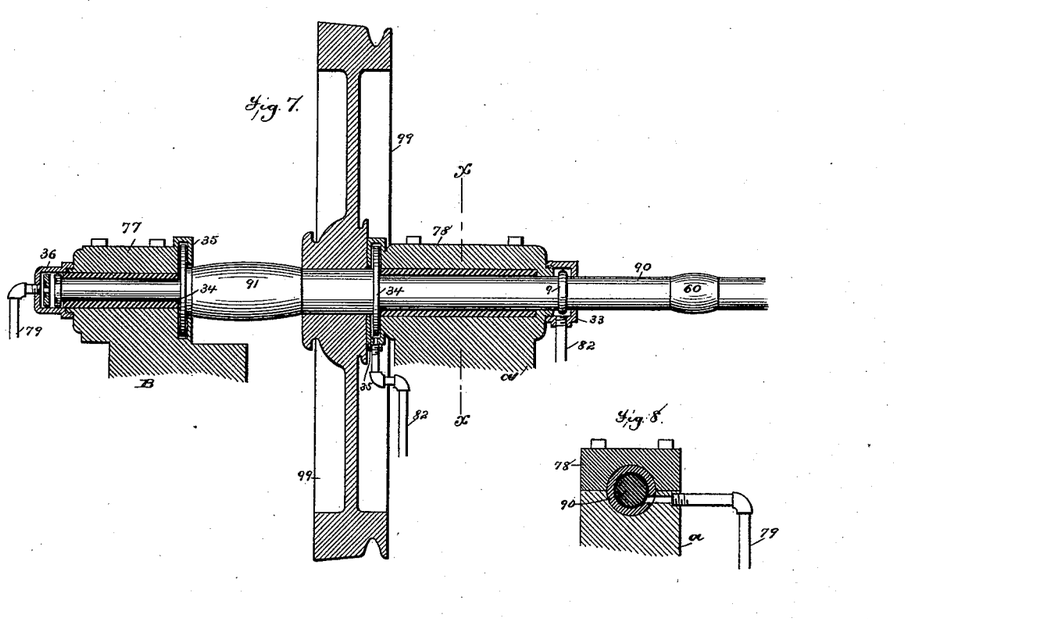
Fig. 7 is an enlarged section taken on the line $x\ x$ of Fig. 1.
Fig. 8 is a cross-section upon a like scale, taken upon the line $x\ x$ of Figs. 2 and 7.

It has been found difficult, owing to the great speed at which the disks 99 are revolved, to keep the bearings of the shaft 90 properly lubricated by ordinary means. To overcome this the machine is provided with a small force-pump, 94, by which a flow of oil is maintained through the bearing 77 78 of the shaft, so as to keep the bearings constantly lubricated. This pump is operated from a crank-shaft, 41, having a pulley, 42, which is connected by a belt, 43, with a pulley, 44, upon the shaft 63. The suction-pipe 80 of the pump communicates with a supply of oil contained in a trough or tank, E, located at the base of the machine, and the discharge-pipe 81 of the pump is provided with branches 79, which communicate with oil-openings at or near the centers of the bearings 78, and with small closed chambers formed by caps 36, which screw onto the outer ends of the bearings 77 and inclose the ends of the shaft 90. The inner ends of the bearings 77 and the outer ends of the bearings 78 are provided with recesses 35, (see Figs. 2 and 7,) into which extend disks 34, secured to the shaft 90, and the inner ends of the bearings 78 are provided with caps 33, which fit around the shaft 90, and are held against the ends of the bearings by rods 32, and which form small closed chambers, within which the shaft 90 is provided with circumferential ribs or projections 9, the purpose of which, as well as of the disks 34, will be presently explained. The recesses 35 and the chambers formed by the caps 33 are provided with waste-pipes 82, which discharge into the trough E.

The operation of this lubricating apparatus is as follows: Whenever it is desired to put the lubricating apparatus into operation, the belt 43 will be shifted from the loose pulley 31 to the pulley 42, so as to set the pump 94 in operation. The oil will then be drawn from the trough E through the pipe 80 into the pump, and then forced by the pump through the pipe 81 and its branches 79 to the bearings 77 78. The pump will force the oil into the bearings with such a degree of pressure that it will be caused to find its way through the bearings around the shaft and escape into the recesses 35 and the chambers formed by the caps 33, from which recesses and chambers it will flow back to the trough through the pipes 82. By this means a constant circulation of oil can be maintained through the bearings 77 78. Any leakage of the oil from the bearings is prevented by the disks 34 and ribs 9, which throw the oil away from the shaft by centrifugal force, so that it will all flow into the pipes 82. The discharge-pipe 81 of the pump 94 is provided with a branch, 83, which opens over the trough E, and is provided with an escape-valve, 11, which operates, when the pump forces the oil into the pipe 81 faster than it can circulate through the bearings 77 78, to allow a portion of it to escape and flow directly back into the trough. It will be observed that the pulleys 52 and 44 are of sufficient width to permit the frame C to have the necessary amount of longitudinal movement without interfering with the proper running of the belts 61 and 43.

It will readily be understood that the mechanism herein shown may be modified considerably as to many of its details without departing from its essential characteristics. For example, one of the disks or wheels 99 may be omitted; but in such case it will of course be necessary, after one of a pair of wheels has been dressed, to turn the axle end for end to dress the other wheel. If it should be desired to dress only the treads of the wheels, the edge or edges of the disk or disks 99 will be made to form only the counterpart of the tread, or if it should be desired to dress only the flanges of the wheels the edge or edges of the disk or disks will be made to form only the counterpart of the flange. So, also, the mechanism for revolving the wheels during the dressing operation may be varied from that shown without changing greatly from the general operation of the machine. It will of course be readily seen that the screw-rods 40, and also the screw-rods 38, may be connected by suitable mechanism, so that both rods of each pair can be operated simultaneously from one side of the machine, and it will also be seen that one of the screw-rods 38 may be omitted. If it should be desired to give a greater range of longitudinal movement to the frame or carriage C, the bearings 88 89 can of course be extended to any desired extent to permit of this.

By means of the process and mechanism which has been described car-wheels made of the hardest chilled iron which cannot be acted on successfully by a cutting-tool, as well as wheels made of softer material, can be perfectly dressed in a very short time and at a comparatively small expense. The speed at which the disk or disks 99 must be revolved to produce satisfactory results will of course depend to some extent upon the character of the metal being dressed. With a disk forty-two inches in diameter and revolved at the rate of three thousand revolutions per minute wheels made of the hardest chilled iron can be readily dressed, while softer metals can be dressed by revolving the disk at a somewhat less speed. Better results can, however, be accomplished by revolving the disks at a much higher speed. If the size of the disk is increased, the same result can of course be accomplished with a proportionally less number of revolutions per minute, and vice versa. Whether or not during the dressing any actual contact takes place between the disk and the wheel I am unable to say, as, owing to the very great velocity of the disk and the intense heat and burning that exists at the point where the metal is being removed, it is impossible to make accurate observations; but if any contact does take place between the disk and wheel such contact must be very slight, as I have found that after long use the disk shows no perceptible evidence of wear, which would certainly be the case if there was any considerable amount of friction between the disk and the metal being acted upon. I have also found that if the speed of the disk (the disk being forty-two inches in diameter) is reduced to one thousand to fifteen hundred revolutions per minute, and the wheel moved up to the disk in the manner already described, the disk, and also the wheel, will become very highly heated, the disk will wear rapidly away, and no metal, or practically none, will be removed from the wheel, while, on the other hand, if the speed of the disk is increased to from two thousand five hundred to three thousand revolutions per minute, and the wheel moved up to it in the same manner, the disk will neither be worn nor heated to any considerable extent, while the surplus metal will be rapidly burned and melted off from the surface of the wheel, and the dressing will be accomplished in a rapid and perfect manner, as stated. The speed at which the wheel should be revolved to present its surface to the disk will of course depend upon the speed of the disk, the character of the metal of which the wheel is composed, and the depth to which it is desired to dress away the metal. If it is not desired to harden the dressed surface at all, or to any considerable extent, the wheel will be moved comparatively slowly—say about three or four revolutions per minute; but if it is desired to harden the dressed surface, as in the case of a steel car-wheel, or to dress a body made of highly-hardened steel without drawing the temper, the wheel will be revolved comparatively fast—say about ten or twelve revolutions per minute—and will be moved up to the disk slowly, so that only a very thin dressing will be removed at each turn. This feature of hardening the dressed surface is one of very great importance, as by this means car-wheels which are made of low-carbon steel, which cannot be hardened by any of the common processes, can be provided with exceedingly hard wearing-surfaces.

This mechanism and process herein described are exceedingly important and valuable, not only for the purpose of dressing new chilled-iron wheels before they are put into use, thus making them more uniform and durable, but more particularly for the purpose of dressing and hardening the treads, or treads and flanges, of steel wheels which are made of low-carbon steel that cannot be hardened by any of the common processes. By this means the surfaces of the treads, or treads and flanges, of steel wheels can be made exceedingly hard, so as to resist wear, while the main part or body of the metal of which the wheel is composed remains soft, so as to withstand the jar and strain to which it is subjected without danger of being cracked or broken. By means of this process and machine wheels which have been for some time in use and have become so worn out of shape as to be worthless, except for old iron, can be redressed and rendered nearly or quite as good as new. This latter use is one of particular importance, because heretofore no means has been known by which chilled wheels which have been rendered useless by reason of wear could be re-dressed without an expenditure of time and money, which rendered such re-dressing impracticable.

In conclusion, it is to be remarked that the mechanism herein shown can by slight modification be adapted for use in dressing, or dressing and hardening, the surfaces of other metal bodies than car-wheels. To do this it is only necessary to vary the shape of the edge or periphery of the disk or disks, so as to make it or them conform to or form a counterpart of the surface to be dressed.

The process herein described is not herein claimed, because, as before stated, it forms the subject-matter of another application for Letters Patent. Neither is the improved wheel having its surface dressed and hardened, as herein described, claimed herein, as that also forms the subject-matter of another application.

What is claimed is—

1. The combination, with a smooth metal disk or wheel arranged to be revolved rapidly, and having its periphery shaped to form the counterpart of the surface to be dressed, of means for supporting a car-wheel or other cylindrical body so that it can be revolved freely with its periphery in close proximity to the periphery of the disk, substantially as described.

2. The combination, with a smooth metal disk or wheel arranged to be revolved rapidly, and having its periphery shaped to form the counterpart of the surface to be dressed, of means for supporting a car-wheel or other cylindrical body so that it can be revolved freely with its periphery in close proximity to the periphery of the disk, and means for imparting a slow rotary movement to the wheel or other body, substantially as described.

3. The combination, with a smooth metal disk or wheel arranged to be revolved rapidly, and having its periphery shaped to form the counterpart of the surface to be dressed, of the movable frame or carriage C, having means for supporting a car-wheel or other cylindrical body so that it can be revolved freely with its periphery in close proximity to the periphery of the disk, and means for imparting a slow rotary movement to the wheel or other body, substantially as described.

4. The combination, with a smooth metal disk or wheel arranged to be revolved rapidly, and having its periphery shaped to form the counterpart of the surface to be dressed, of the movable frame or carriage C, having means for supporting a car-wheel or other cylindrical body so that it can be revolved freely with its periphery in close proximity to the periphery of the disk, means for imparting a slow rotary movement to the wheel or other body, and means for moving the carriage to and from the disk, substantially as described.

5. The combination, with the smooth metal disks or wheels 99, arranged to be revolved rapidly, and having their peripheries shaped to form the counterparts of the peripheries of a pair of car-wheels, of the movable frame or carriage C, having means for supporting the axle upon which the wheels are secured, so that the wheels can be revolved freely with their peripheries in close proximity to the peripheries of the disks, means for imparting a slow rotary movement to the wheels, and means for moving the carriage to and from the disks, substantially as described.

6. The combination, with a revolving disk or disks, 99, of the movable frame or carriage C, having the chucks D, in which the axle 98 is supported so as to turn freely, substantially as described.

7. The combination, with a revolving disk or disks, 99, of the movable frame or carriage C, having means for supporting the axle 98 so that it can turn freely, and the friction-wheel or wheels 52, and connections for turning the car wheel or wheels or other body to present it or them to the disk or disks, substantially as described.

8. The combination, with a revolving disk or disks, 99, of the movable frame or carriage C, having means for supporting the axle 98 so that it can turn freely, and the spring-pressed friction wheel or wheels 52, and connections for turning the car wheel or wheels or other body to present it or them to the disk or disks, substantially as described.

9. The combination, with a revolving disk or disks, 99, of the frame or carriage C, having means for supporting the axle 98 so that it can turn freely, and the spring-pressed friction wheel or wheels 52, mounted in a swinging frame or frames, and connections for turning the car wheel or wheels or other body to present it or them to the disk or disks, substantially as described.

10. The combination, with the shaft 90, carrying the disk or disks 99, of the pump 94, and connections for forcing oil through the bearings of the shaft, substantially as described.

11. The combination, with the shaft 90, carrying the disk or disks 99, of the pump 94, having the pipes 81 79, communicating with the bearings of the shaft, and provided with the branch 83, having an escape-valve, and the pipes 82, for withdrawing the oil from the bearings, substantially as described.

In testimony whereof I have hereunto set my hand in the presence of two subscribing witnesses.

GEORGE W. MILTIMORE.

Witnesses:
J. A. HOOEY,
T. H. PALMER.